US004001685B2

United States Statutory Invention Registration [19]

[11] Reg. Number: H1685

[45] Published: Oct. 7, 1997

Lau et al.

[54] DRILLING FLUID

[75] Inventors: Hon Chung Lau; Arthur Herman Hale; Louis Anthony Bernardi, Jr., all of Houston, Tex.

[73] Assignee: Shell Oil Company, Houston, Tex.

[21] Appl. No.: 499,156

[22] Filed: Jul. 7, 1995

[51] Int. Cl.[6] ..... C09K 7/04

[52] U.S. Cl. ..... 507/140

[58] Field of Search ..... 507/140, 103

[56] References Cited

U.S. PATENT DOCUMENTS

| | | | |
|---|---|---|---|
| 3,622,513 | 11/1971 | Miller | 252/8.5 M |
| 5,072,794 | 12/1991 | Hale et al. | 175/50 |
| 5,301,754 | 4/1994 | Cowan et al. | 507/140 |
| 5,307,877 | 5/1994 | Cowan et al. | 507/140 |
| 5,332,040 | 7/1994 | Nahm et al. | 507/140 |
| 5,343,952 | 9/1994 | Cowan et al. | 507/140 |
| 5,363,918 | 11/1994 | Cowan et al. | 507/140 |

*Primary Examiner*—Charles T. Jordan
*Assistant Examiner*—Meena Chelliah

[57] ABSTRACT

Zinc oxide and zirconium oxide are used as weighting materials for water and oil based drilling fluids for horizontal wells.

5 Claims, No Drawings

DRILLING FLUID

BACKGROUND

The present invention relates to drilling fluids of the type employed in oil and gas wells. More particularly, the invention relates to weighting materials for water and oil based drilling fluids for horizontal wells.

In drilling geopressured horizontal wells, a drilling fluid with density between 12–19 ppg is often required. Traditionally, barite (barium sulfate) is used as weighting material for drilling fluid. Barite is not suitable for horizontal wells because a barite-laden filtercake cannot be dissolved. Undissolved barite particles can invade the production screen in the horizontal well and plug it causing cessation or reduction in flow of hydrocarbon.

The present invention in response to this need in the art provides a solution as described hereinafter.

SUMMARY

The primary purpose of the present invention is to alleviate problems with weighting materials in drilling muds used in drilling geopressured horizontal wells. To this end, zinc oxide and zirconium oxide are used as weighting agents in such drilling fluids, preferably in particle sizes of the order of 10 microns or a range of 4 to 200 microns.

PREFERRED EMBODIMENTS

Zinc oxide is a particularly suitable material for weighting because, it has a high density (5.6 g/ml versus 4.5 for barite); It is soluble in acids (e.g. HCl); and its particle size can be designed so that it does not invade the formation. Acid solubility is particularly desirable because dissolved ZnO can be produced through a production screen without plugging it. A high density means less weighting material is needed per unit mud volume to achieve a desired density. Tests were performed with commercially available ZnO particles. Surprisingly, it was found that the particle size (of the order of 10 microns) is such that the ZnO particles do not invade the formation core with the filtrate. Also it is not large enough to settle out of suspension. Other weighting material such as manganese tetraoxide is so fine that it invades the formation with the filtrate. Zirconium oxide possesses similar properties as ZnO. It has a density of 5.7 and is soluble in nitric acid and hot concentrated hydrochloric, hydrofluoric and sulfuric acids, making it useful in the invention.

As above observed, these materials are acid soluble. Hence filtercake formed from them can be dissolved and produced through the production screen without plugging it. Also they are fine enough to be easily suspended in the oil or water base mud, but not too fine to invade the formation with the filtrate. The very high acid solubility of ZnO makes it particularly suitable as weighting material. This problem is unique to horizontal wells because they are often completed as open holes without a casing. A production screen is placed in the open hole to retain sand and yet allow hydrocarbon to be produced.

Solubility of ZnO in HCl at elevated temperatures was measured. At 150° F., solubility of ZnO in 15% w/v HCl is 60 lb/bbl and 98 lb/bbl in 25% w/v HCl. Return permeability experiments with ZnO weighted waterbase mud showed that the ZnO mud did not damage the formation and that the ZnO filtercake can be dissolved by HCl. Experiments also showed that an aqueous NaBr mud weighted with ZnO has acceptable rheology for drilling.

As above-mentioned, particle size is extremely important to the invention. U.S. Pat. No. 3,622,513 to George Miller, patented Nov. 23, 1961, incorporated hereinto by reference thereto, discloses the use of zinc oxide in an oil base mud as a weighting agent. However, Miller uses very small particle sizes of less than 3 microns. This would not be suitable for use with the present invention. The size of the particles of this invention is such that it does not invade the formation core with the filtrate and it is not large enough to settle out of suspension. Accordingly, the present invention is useful with a particle size range of 4 to 200 microns, more preferably 6 to 100, and most preferably 8 to 50.

The present invention is suitable for use with all types of muds, both water base and oil base, as well as emulsion muds, including invert emulsion muds and synthetic muds. The invention is suitable for use with the alcohol-in-oil drilling fluid described in U.S. Pat. No. 5,072,794 to Hale et al, issued Dec. 17, 1991, which disclosure is incorporated hereinto by reference thereto. The oil can be vegetable or mineral or can be synthetic such as esters, isomerized olefins or polyalpha olefins. For water base muds the water can be fresh, brackish or brine.

We claim:

1. A drilling fluid for use in geopressured horizontal wells comprising a liquid carrier medium and a weighting agent of zinc oxide or zirconium oxide having a particle size range of 4 to 200 microns.

2. The drilling fluid of claim 1 wherein the particle size range is 6 to 100 microns.

3. The drilling fluid of claim 1 wherein the particle size range is 8 to 50 microns.

4. The drilling fluid of claim 1 wherein the liquid carrier medium is water base.

5. The drilling fluid of claim 1 wherein the liquid carrier medium is oil base.

* * * * *